(12) United States Patent
Braithwaite

(10) Patent No.: US 9,416,613 B2
(45) Date of Patent: Aug. 16, 2016

(54) THEFT-DETERRENCE DEVICE

(75) Inventor: Julian Braithwaite, Leeds (GB)

(73) Assignee: Cameron International Corporation, Houston, TX (US)

( * ) Notice: Subject to any disclaimer, the term of this patent is extended or adjusted under 35 U.S.C. 154(b) by 1684 days.

(21) Appl. No.: 12/663,702

(22) PCT Filed: Jul. 8, 2008

(86) PCT No.: PCT/IB2008/052747
§ 371 (c)(1),
(2), (4) Date: Dec. 8, 2009

(87) PCT Pub. No.: WO2009/007916
PCT Pub. Date: Jan. 15, 2009

(65) Prior Publication Data
US 2010/0178131 A1    Jul. 15, 2010

Related U.S. Application Data

(60) Provisional application No. 60/959,227, filed on Jul. 12, 2007.

(51) Int. Cl.
*F16B 41/00* (2006.01)
*E21B 33/03* (2006.01)
*F16B 33/00* (2006.01)

(52) U.S. Cl.
CPC ............ *E21B 33/03* (2013.01); *F16B 33/002* (2013.01); *F16B 41/005* (2013.01)

(58) Field of Classification Search
USPC ............. 411/108, 235, 315, 372.6, 910, 337, 411/372.5, 373, 374, 429, 533, 965, 999, 411/64, 172, 21, 218, 422, 996; 70/58, 70/176–180, 229–232, DIG. 57
See application file for complete search history.

(56) References Cited

U.S. PATENT DOCUMENTS 153,321 A * 7/1874 Douglass ................. 70/180
185,633 A * 12/1876 Enochs ................... 411/325
566,050 A * 8/1896 Woodard ................. 411/212
(Continued)

FOREIGN PATENT DOCUMENTS

AU    426056    7/1972
EP    0309129    3/1989
(Continued)

OTHER PUBLICATIONS

PCT International Search Report and Written Opinion for PCT/IB2008/052747, dated Apr. 7, 2009.

*Primary Examiner* — Flemming Saether
(74) *Attorney, Agent, or Firm* — Fletcher Yoder P.C.

(57) ABSTRACT

In accordance with certain embodiments, the present invention provides a theft-deterrence device, which can be used to deter theft of oil-and-gas equipment. For example, one such embodiment provides a nut-and-bolt assembly that includes an extended bolt and a standard the hexagonal nut. To deter theft, the exemplary assembly includes an outer sleeve that is disposed about the nut and extended bolt and that is free to rotate. Resultantly, the sleeve prevents the application of torque to the nut and also protects against shearing of the extended stud. The exemplary assembly also includes a tamper-resistant screw extending through the stud and cooperating with a retaining ring disposed above the nut, to prevent removal of the outer sleeve.

20 Claims, 2 Drawing Sheets

(56) References Cited

U.S. PATENT DOCUMENTS

| | | | |
|---|---|---|---|
| 1,105,123 A * | 7/1914 | Bardwell | 411/201 |
| 1,190,445 A * | 7/1916 | Mitchell | 411/315 |
| 1,216,954 A | 2/1917 | Crowley | |
| 1,339,015 A * | 5/1920 | Blake | 411/197 |
| 1,349,491 A | 8/1920 | Burton | |
| 1,424,008 A * | 7/1922 | Fleischer | 411/533 |
| 1,530,521 A * | 3/1925 | Robinson | 70/232 |
| 1,741,314 A * | 12/1929 | Johnson | 70/259 |
| 1,982,363 A * | 11/1934 | Wheeler | 72/195 |
| 2,857,205 A * | 10/1958 | Stricklen | 301/35.624 |
| 3,289,521 A * | 12/1966 | Van Sloun | 411/340 |
| 3,492,841 A * | 2/1970 | Ipri | 70/231 |
| 3,592,250 A * | 7/1971 | Petroshanoff | 411/320 |
| 3,599,528 A * | 8/1971 | Kushnick | 411/337 |
| 3,631,757 A * | 1/1972 | Parkin | 411/431 |
| 4,007,863 A * | 2/1977 | Norris | 224/403 |
| 4,076,158 A * | 2/1978 | Barr | 224/42.25 |
| 4,084,630 A * | 4/1978 | Lewis | 411/209 |
| 4,122,693 A * | 10/1978 | Barr | 70/56 |
| 4,167,886 A * | 9/1979 | Seghezzi et al. | 411/4 |
| D255,540 S | 6/1980 | Baylis | D8/331 |
| 4,225,066 A * | 9/1980 | Barr | 224/42.24 |
| 4,253,509 A | 3/1981 | Collet | |
| 4,308,733 A * | 1/1982 | Tampa | 70/259 |
| 4,324,516 A * | 4/1982 | Sain et al. | 411/5 |
| 4,358,941 A * | 11/1982 | Zimmer | 70/229 |
| 4,433,854 A * | 2/1984 | Smith | 280/511 |
| 4,484,849 A * | 11/1984 | Klimowicz | 411/397 |
| 4,521,146 A * | 6/1985 | Wharton | 411/1 |
| 4,537,543 A | 8/1985 | Scott et al. | |
| 4,540,322 A * | 9/1985 | Coffia | 411/338 |
| 4,553,890 A * | 11/1985 | Gulistan | 411/318 |
| 4,602,903 A | 7/1986 | Wilburn | |
| 4,611,379 A * | 9/1986 | Heitzman | 29/426.5 |
| 4,620,428 A * | 11/1986 | Kopesky | 70/175 |
| 4,621,230 A * | 11/1986 | Crouch et al. | 324/110 |
| 4,645,397 A * | 2/1987 | Howe | 411/43 |
| 4,659,273 A * | 4/1987 | Dudley | 411/373 |
| 4,732,517 A * | 3/1988 | Crouch et al. | 411/39 |
| 4,848,113 A * | 7/1989 | Parks | 70/259 |
| 5,071,300 A * | 12/1991 | McCauley | 411/222 |
| 5,205,616 A * | 4/1993 | Wright | 301/37.374 |
| 5,290,057 A * | 3/1994 | Pellerito | 280/507 |
| 5,380,070 A * | 1/1995 | FitzGerald | 301/37.374 |
| 5,391,033 A * | 2/1995 | Gibbons | 411/263 |
| 5,426,963 A * | 6/1995 | Tafoya et al. | 70/259 |
| 5,511,814 A * | 4/1996 | Floyd | 280/507 |
| 5,630,687 A * | 5/1997 | Robinson | 411/372.6 |
| 5,890,859 A * | 4/1999 | Hasnik | 411/372 |
| 5,904,383 A * | 5/1999 | van der Wal | 292/307 B |
| 5,975,054 A * | 11/1999 | Alvarez-Avila et al. | 123/466 |
| 6,053,681 A * | 4/2000 | Mattershead | 411/195 |
| 6,086,480 A | 7/2000 | Ellis et al. | |
| 6,135,691 A * | 10/2000 | Nadarajah et al. | 411/431 |
| 6,146,070 A * | 11/2000 | Koma | 411/5 |
| 6,279,600 B1 * | 8/2001 | Robinson | 137/232 |
| 6,588,242 B1 * | 7/2003 | Beaty | 70/231 |
| 6,626,465 B2 * | 9/2003 | Lacroix et al. | 285/80 |
| 6,695,557 B2 * | 2/2004 | Hove et al. | 411/429 |
| 6,739,631 B2 * | 5/2004 | Smith et al. | 285/337 |
| 6,910,355 B2 * | 6/2005 | Swanson | 70/232 |
| 6,991,016 B2 * | 1/2006 | Lewis | 152/427 |
| 7,172,381 B2 * | 2/2007 | Miyazaki | 411/372.6 |
| 7,524,154 B2 * | 4/2009 | LaConte et al. | 411/551 |
| 7,708,510 B2 * | 5/2010 | Reimler | 411/166 |
| 7,761,972 B2 * | 7/2010 | LaConte et al. | 29/525.02 |
| 7,862,278 B2 * | 1/2011 | Ching | 411/372.6 |
| 8,113,754 B2 * | 2/2012 | Dahl et al. | 411/215 |
| 2005/0025611 A1 * | 2/2005 | Rioux | 411/429 |
| 2006/0088401 A1 * | 4/2006 | Radhavan et al. | 411/372.5 |
| 2006/0120825 A1 * | 6/2006 | Miyazaki | 411/372.6 |
| 2007/0039140 A1 * | 2/2007 | Ching | 24/279 |

FOREIGN PATENT DOCUMENTS

| | | |
|---|---|---|
| EP | 1403467 | 3/2004 |
| GB | 810394 | 3/1959 |
| GB | 1603147 | 11/1981 |

* cited by examiner

THEFT-DETERRENCE DEVICE

CROSS-REFERENCE TO RELATED APPLICATIONS

This application claims priority to PCT Application No. PCT/IB2008/052747 entitled "Theft-Deterrence Device", filed on Jul. 8, 2008, which is herein incorporated by reference in its entirety, and which claims priority to U.S. Provisional Patent Application No. 60/959,227, entitled "Theft-Deterrence Device", filed on Jul. 12, 2007, which is herein incorporated by reference in its entirety.

FIELD OF THE INVENTION

The present invention relates generally to a theft-deterrence device. In accordance with one embodiment, the present invention provides a theft-deterrence device for use in the oil-and-gas industry.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

As will be appreciated, oil and natural gas have a profound effect on modern economies and societies. Indeed, devices and systems that depend on oil and natural gas are ubiquitous. For instance, oil and natural gas are used for fuel in a wide variety of vehicles, such as cars, airplanes, boats, and the like. Further, oil and natural gas are frequently used to heat homes during winter, to generate electricity, and to manufacture an astonishing array of everyday products.

In order to meet the demand for such natural resources, companies often invest significant amounts of time and money in searching for and extracting oil, natural gas, and other subterranean resources from the earth. Particularly, once a desired resource is discovered below the surface of the earth, drilling and production systems are often employed to access and extract the resource. These systems may be located onshore or offshore depending on the location of a desired resource. Further, such devices may be located in various parts of the world that are politically unstable and, in some cases, involved in armed conflict.

Consequently, equipment used to extract natural resources is a high-value target for theft, because the demand for such equipment is high and because the materials from which the equipment is made can be easily recycled, for instance. Once absconded with, replacing lost equipment can be an expensive endeavor, even if replacement equipment is readily available. Moreover, the theft of flow-control equipment, such as valves, can lead to environmental and safety concerns.

SUMMARY

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Certain embodiments of the present invention relate to a fastening mechanism that includes theft-deterrence features. For example, one such embodiment provides a nut-and-bolt assembly that includes an extended bolt and a standard the hexagonal nut. To deter theft, the exemplary assembly includes an outer sleeve that is disposed about the nut and extended bolt, and that is free to rotate. Resultantly, the sleeve prevents the application of torque to the nut and also protects against shearing of the extended stud. The exemplary assembly also includes a tamper-resistant screw extending through the stud and cooperative with a retaining ring, to prevent removal of the outer sleeve.

Various refinements of the features noted above may exist in relation to various aspects of the present invention. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. Again, the brief summary presented above is intended only to familiarize the reader with certain aspects and contexts of the present invention without limitation to the claimed subject matter.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF SPECIFIC EMBODIMENTS

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

Figure 1:
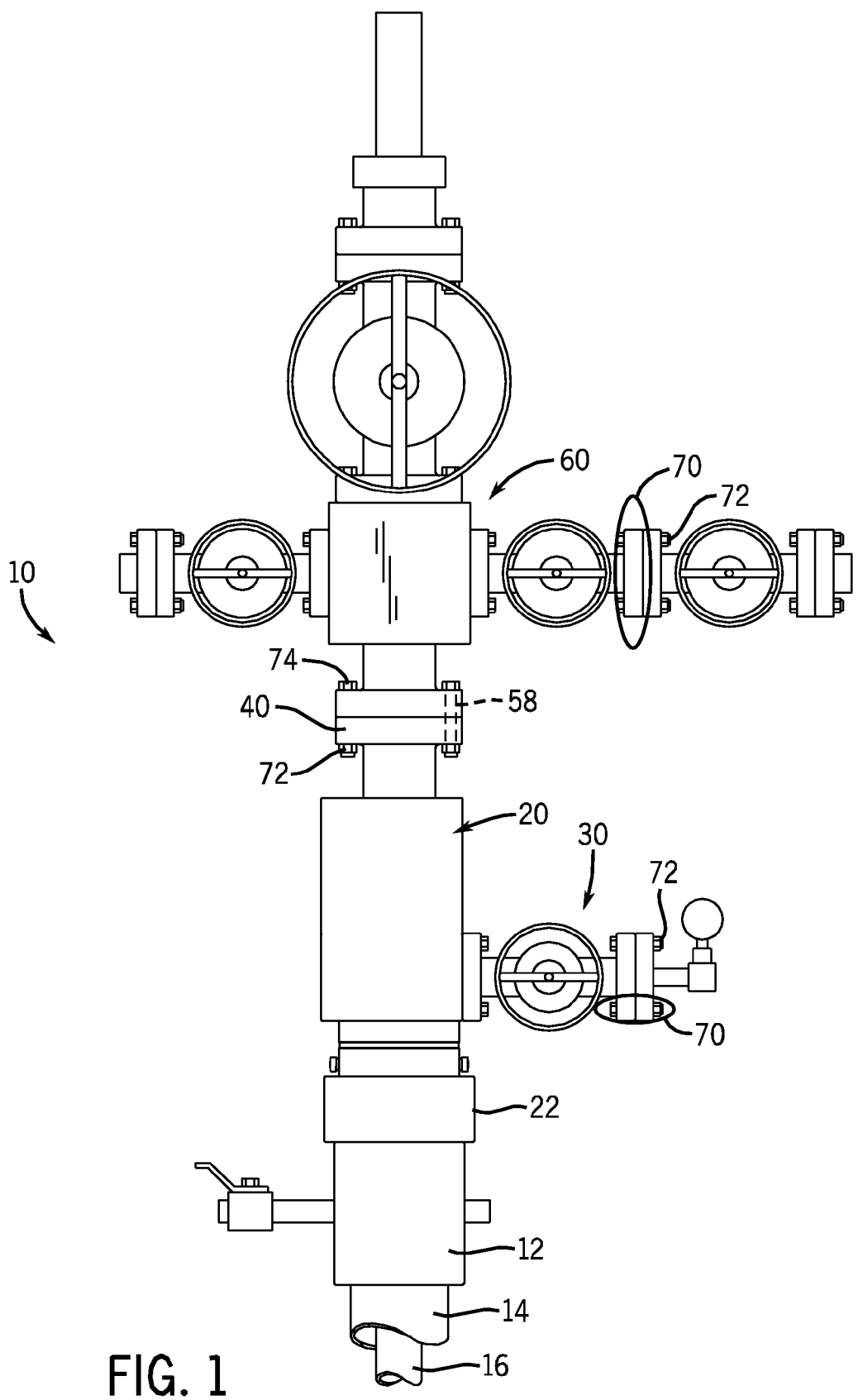
FIG. 1 is a front elevational view of a wellhead assembly having a number of unprotected bolt assemblies as found in conventional usage.

Turning now to the present figures, a conventional wellhead assembly 10 is provided in FIG. 1. This wellhead assembly 10 includes a casing head 12 coupled to a surface casing 14. The wellhead assembly 10 also includes a production casing 16, which may be suspended within the casing head 12 and the surface casing 14 via a casing hanger. It will be appreciated that a variety of additional components may be coupled to the casing head 12 to facilitate production from a subterranean well.

For instance, in one embodiment, a tubing head or spool 20 is coupled to the casing head 12. In the presently illustrated embodiment, the tubing spool 20 is coupled to the casing head 12 via a union nut 22, which is threaded onto the casing head 12 via complementary threaded surfaces. Of course, it will be appreciated that wellhead members, such as the tubing spool 20, may be coupled to the casing head 12 in any suitable manner, including through the use of various other connectors, collars, or the like. In one embodiment, the tubing spool 20 may be adapted to receive an extended portion of the casing hanger 18, for example.

A valve assembly 30 is coupled to the exemplary tubing spool 20 and may serve various purposes, including releasing pressure from an internal bore of the tubing spool 20, for instance. The exemplary tubing spool 20 also includes a flange 40 having a plurality of mounting apertures 58 to facilitate coupling of various components or wellhead members, such as additional valves or a "Christmas tree," (i.e., element 60) to the tubing spool 20. The valve assembly 30, the Christmas tree 60, and the tubing head 20 are coupled to one another via a plurality of bolt assemblies 70, each having a nut 72 that is threaded onto a bolt 74 and that is unprotected against theft. Moreover, the Christmas tree 60 is an assembly of valves interconnected to one another using a variety of bolt assemblies 70, which, again, include nuts 72 (e.g., tool interface) unprotected against theft. Thus, a component of the wellhead assembly 10 could easily be removed simply by applying torque to the nut 72 (e.g., tool interface) while preventing rotation of the head of the corresponding bolt 74.

Figure 2:
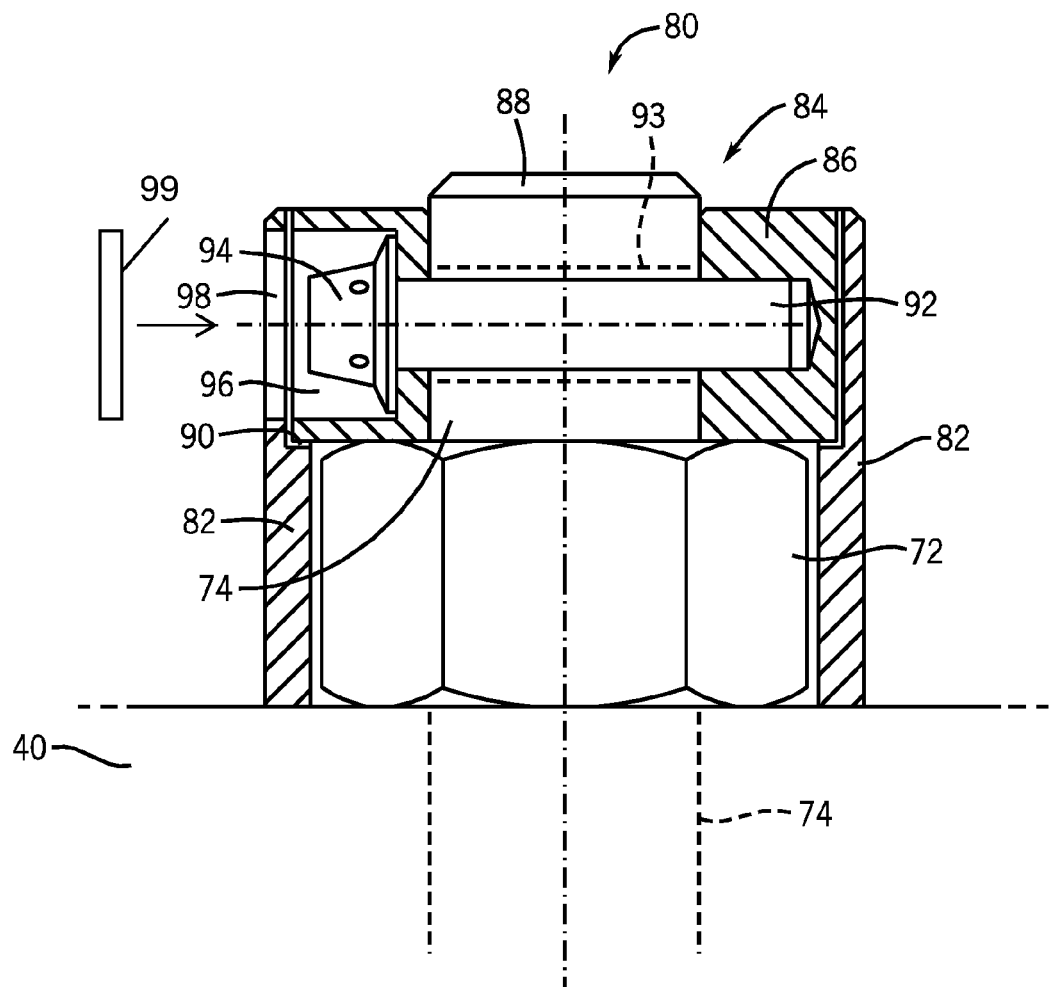
FIG. 2 is a partial cross-sectional view of a bolt assembly incorporating theft-deterrence features, in accordance with one embodiment of the present invention.

FIG. 2 illustrates an exemplary embodiment of a theft-deterrence device 80 in accordance with one exemplary embodiment of the present invention. Specifically, the exemplary device prevents the application of torque to the nut, thus preventing its removal. To effectuate this, the exemplary device 80 includes an outer sleeve 82 that surrounds the nut 72 but does not engage with the nut 72. Resultantly, if any torque is applied to the sleeve 82, the sleeve simply rotates and no torque is transferred to the nut 72. Advantageously, the sleeve 82 also protects against shearing of the bolt 74 to which the nut 72 is attached. The sleeve 82 may be formed of any suitable material, such as a robust composite or a metallic alloy, for example. Moreover, the sleeve 82 may have any number of suitable shapes, but a tubular shape works well to prevent the application of torque.

To prevent removal of the sleeve 82, the exemplary device 80 includes a locking mechanism 84. For example, the locking mechanism 84, as presently illustrated, includes a retaining ring, which is in the embodiment a threaded ring 86, mounted to a portion of the bolt 74 extending above the nut 72 (i.e., an extended portion 88). This threaded ring 86 has an outer diameter that is slightly larger than the nut 72 and cooperates with a shoulder 90 on the interior of the sleeve 82 to prevent the sleeve's removal. Advantageously, the illustrated sleeve 82 extends to surround the threaded ring 86, to protect the ring 86 and the extended portion 88 of the bolt 74 from shearing, for instance. Moreover, the sleeve 82 also protects against the application of torque to the ring 86.

The exemplary locking mechanism 82 also includes a retaining pin 92 which engages with the extended portion 88. For example, the pin 92 can be inserted through a drilled hole 93 in the extended portion 88. This retaining pin 92 prevents the removal of the threaded ring 86 and, as such, also prevents removal of the nut 72. As illustrated, the retaining pin 92 is a tamper-resistant screw with a head profile 94 that requires a special tool for removal. The retaining pin 92, in accordance with other embodiments, may include other features that prevent its removal. For example, the retaining pin 92 may cooperate with a locked cotter pin that extends through the top of the threaded ring and cannot be removed without an appropriate key.

As further theft-deterrence features, the exemplary threaded ring 86 includes a recessed portion 96 in which the head of the pin 92 resides, thus shielding the head against tampering. This recessed portion 96 can cooperate with a window 98 in the sleeve 82 for access. Thus, the pin 92 can only be accessed if the window 98 is aligned with the recessed portion 96. For added security, a lockable access panel 99 may cover the window 98.

Although the above embodiments are described in relation to a theft-deterrence device disposed about the nut of a bolt assembly, the present invention is equally applicable to protection of the head of bolt, or any other surface to which torque is applied for assembly or removal. In fact, the present invention affords benefits to any number of situations in which it is desirable to selectively prevent the application of torque to a given structure. The present invention may be applied to any of the bolt assemblies illustrated in FIG. 1, to deter the theft of the illustrated components.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A theft-deterrence device, comprising:
a sleeve surrounding a tool interface of a bolt assembly, wherein the sleeve has a shoulder located on an interior surface, and the sleeve is free to rotate with respect to the tool interface;
a retaining ring disposed above the tool interface, wherein the retaining ring is configured to cooperate with the shoulder to block removal of the sleeve; and
a retaining pin that extends through a bolt of the bolt assembly to block removal of the retaining ring, wherein the sleeve, the retaining ring, and the retaining pin are removable to enable access to the tool interface, and the retaining pin includes a tamper-resistant feature.

2. The device of claim 1, wherein the bolt assembly is disposed on an oil-and-gas production equipment.

3. The device of claim 1, wherein the tamper-resistant feature comprises a head configured to be removed with a key rather than a standard tool.

4. The device of claim 1, wherein the retaining pin comprises a tamper-resistant screw.

5. The device of claim 1, wherein an extended portion of the bolt assembly protrudes above the tool interface, wherein the shoulder is positioned approximately where the extended portion protrudes above the tool interface and the retaining pin engages with the retaining ring and extends through the extended portion of the bolt assembly to secure the retaining ring with respect to the bolt assembly.

6. The device of claim 1, wherein the retaining ring includes a recessed portion configured to receive the retaining pin.

7. The device of claim 1, wherein the sleeve includes a window.

8. The device of claim 7, comprising a lockable panel covering the window.

9. The device of claim 1, wherein the sleeve is configured to be disposed about a nut secured to a bolt of the bolt assembly, wherein the nut has the tool interface, wherein application of torque to the sleeve is not transferable to the nut, the retaining ring is configured to couple to the bolt and retain an axial position of the sleeve, the retaining pin is configured to be inserted through the bolt and the retaining ring to secure the retaining ring rotationally with respect to the bolt, and the interior surface of the sleeve has a diameter large enough to receive the retaining ring within a volume of the sleeve.

10. The device of claim 1, wherein the sleeve has a cylindrical exterior surface.

11. The device of claim 1, wherein the tool interface comprises one or more tool-engageable flats.

12. The device of claim 1, comprising a mineral extraction component having the theft-deterrence device.

13. A theft-deterrence device, comprising:
  a sleeve configured to surround a tool interface of a first threaded fastener, wherein the sleeve has a shoulder located on an interior surface;
  a retaining ring configured to be disposed inside the sleeve axially offset from the tool interface, wherein the retaining ring is configured to cooperate with the shoulder to block removal of the sleeve; and
  a retaining pin configured to extend laterally into a second threaded fastener coupled to the first threaded fastener to block removal of the retaining ring, wherein the sleeve, the retaining ring, and the retaining pin are removable from the first and second threaded fasteners to enable access to the tool interface, and the retaining pin includes a tamper-resistant feature.

14. The device of claim 13, wherein the sleeve comprises a cylindrical exterior surface.

15. The device of claim 13, wherein the sleeve includes a window, the retaining ring includes a recessed portion configured to receive the retaining pin, and the retaining pin comprises an enlarged head disposed in the recessed portion.

16. The device of claim 15, wherein the sleeve comprises a lockable panel covering the window.

17. The device of claim 13, wherein the tool interface comprises one or more tool-engageable flats.

18. The device of claim 13, wherein the first threaded fastener comprises a nut, and the second threaded fastener comprises a bolt.

19. The device of claim 13, wherein the retaining pin comprises a threaded shaft with an enlarged head.

20. A theft-deterrence device, comprising:
  a sleeve configured to surround a tool interface of a threaded fastener assembly, wherein the sleeve has a shoulder located on an interior surface;
  a retaining ring configured to be disposed inside the sleeve axially offset from the tool interface, wherein the retaining ring is configured to cooperate with the shoulder to block removal of the sleeve; and
  a retaining pin configured to extend laterally into a portion of the threaded fastener assembly to block removal of the retaining ring, wherein the sleeve, the retaining ring, and the retaining pin are removable from the threaded fastener assembly to enable access to the tool interface, and the retaining pin includes a tamper-resistant feature.

* * * * *